(12) United States Patent
Potter et al.

(10) Patent No.: US 7,770,261 B2
(45) Date of Patent: Aug. 10, 2010

(54) FOLDABLE ELECTRONIC DEVICE HAVING A PIVOTABLE COUPLING

(75) Inventors: Mark Potter, Basingstoke (GB); Nicholas Jinkinson, Reading (GB); Nicholas Woodley, London (GB)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/985,894

(22) Filed: Nov. 19, 2007

(65) Prior Publication Data
US 2009/0126152 A1 May 21, 2009

(51) Int. Cl.
*E05D 5/10* (2006.01)
(52) U.S. Cl. ......................................... 16/386
(58) Field of Classification Search ................... 16/386, 16/252, 277, 387; 361/679, 680, 681–683, 361/749; 455/575.3; 348/788; 379/433.13
See application file for complete search history.

(56) References Cited

U.S. PATENT DOCUMENTS

| | | | |
|---|---|---|---|
| 5,628,089 A * | 5/1997 | Wilcox et al. ................. | 16/303 |
| 6,449,144 B1 * | 9/2002 | Yeh ............................ | 361/681 |
| 6,700,784 B2 * | 3/2004 | Huang et al. ................. | 361/715 |
| 7,248,903 B2 * | 7/2007 | Yoda ........................ | 455/575.1 |
| 2005/0225952 A1 | 10/2005 | Takagi ........................ | 361/749 |
| 2005/0246864 A1 * | 11/2005 | Arakawa ...................... | 16/277 |
| 2006/0005356 A1 * | 1/2006 | Amano et al. ................. | 16/341 |
| 2006/0059659 A1 | 3/2006 | Kim et al. ..................... | 16/330 |
| 2008/0186665 A1 * | 8/2008 | Kuo ............................ | 361/683 |

* cited by examiner

*Primary Examiner*—Victor Batson
*Assistant Examiner*—Matthew Sullivan
(74) *Attorney, Agent, or Firm*—The Watson I.P. Group, PLC; Jovan N. Jovanovic; Vladan M. Vasiljevic

(57) ABSTRACT

A foldable electronic device comprising a first housing element, a second housing element and a knuckle assembly. The proximal end of the second housing element includes a knuckle receiving slot. A pivot assembly extends about opposing sides of the knuckle receiving slot. The first housing element is pivotably coupled to the second housing element. The knuckle assembly includes a base member, a knuckle and opposing spigot members. The base member is attached to the second housing element. The knuckle is positioned in the knuckle receiving slot of the second housing element. The opposing spigot members extend away from the opposing side surfaces of the knuckle and into the pivot assembly of the second housing element on opposing sides of the knuckle receiving slot. As a result, the first housing element pivots relative to the second housing element about an axis extending through the opposing spigot members.

26 Claims, 7 Drawing Sheets

FOLDABLE ELECTRONIC DEVICE HAVING A PIVOTABLE COUPLING

BACKGROUND OF THE DISCLOSURE

1. Field of the Disclosure

The disclosure relates in general to a foldable electronic device, and more particularly, to a foldable electronic device having a relatively narrow pivotable coupling which facilitates articulation of the foldable electronic device between a closed orientation and a deployed orientation. The pivotable coupling includes a knuckle assembly which can employ a relatively narrow knuckle.

2. Background Art

The use of foldable electronic devices, such as cellular telephones, and the like has steadily increased. Typically, the foldable electronic devices include a first housing element and a second housing element which are in some manner coupled together so as to permit rotation of the housing elements relative to each other. As a result, the housing elements can be rotated between a closed orientation and a deployed orientation. For example, the device can be stored and maintained in the closed orientation when not in use and then deployed for use.

A number of different manners in which to couple two housing elements of an electronic device have been deployed. Among other structures, a single axis hinge, possibly with damping or biasing features is often used to couple the housing elements. Typically, the hinge spans the entirety or substantially the entirety of the width of the foldable electronic device. Such a construction is utilized as the relatively large width reduces the yawl and wobble of the hinge, and, in turn, one housing element relative to the other housing element. Due to the rather large size of the hinge mechanism, the hinge is often quite cumbersome and limiting from a design standpoint.

Accordingly, what is needed is a pivotable coupling which is less cumbersome than existing hinges, while striving toward limiting yaw and wobble of the two housing elements relative to each other.

SUMMARY OF THE DISCLOSURE

The disclosure is directed to a foldable electronic device comprising a first housing element, a second housing element and a knuckle assembly. The first housing element has a proximal end and a distal end. The second housing has a proximal end and a distal end. The proximal end includes a knuckle receiving slot. A pivot assembly extends about opposing sides of the receiving slot. The first housing element is pivotably coupled to the second housing element at the proximal end of each of the housing elements.

The knuckle assembly includes a base member, a knuckle and opposing spigot members. The base member is attached to the first housing element. The knuckle is positioned in the knuckle receiving slot of the second housing element. The knuckle extends outwardly from the base and includes opposing side surfaces. The opposing spigot members extend away from the opposing side surfaces of the knuckle and into the pivot assembly of the second housing element on opposing sides of the knuckle receiving slot. As a result, the first housing element pivots relative to the second housing element about an axis extending through the opposing spigot members.

In a preferred embodiment, the base includes opposing beams. Each of the opposing beams includes a first segment extending in a first direction from the knuckle and a second segment extending from the first segment in a second direction. In one such embodiment, the first segment and the second segment of each of the opposing beams comprise mirror images of each other about the knuckle. The first and second segments are substantially perpendicular to each other. As such, the first and second segments define two L-shaped beams extending from the knuckle.

In a preferred embodiment, the knuckle includes an internal knuckle passageway. At least one of the opposing spigots includes a spigot passageway in fluid communication with the internal knuckle passageway. An electrical cable, such as a ribbon cable, wire or plurality of wires, extend from the first housing element to the second housing element through the internal knuckle passageway and the spigot passageway.

In another preferred embodiment, the pivot assembly comprises a first cavity on a first side of the knuckle receiving slot, and a second cavity on the second side of the knuckle receiving slot. The first cavity is structurally configured to receive at least a portion of the first spigot. The second cavity is structurally configured to receive at least a portion of the second spigot. Each spigot is rotatable within the respective cavity so that it rotates about the defined axis.

In such a preferred embodiment, the first housing element comprises a base chassis and at least one encapsulating member. Each of the first and second cavities are formed through cooperation of the base chassis and the at least one encapsulating member.

In one embodiment, a plurality of encapsulating members are contemplated, such as a first encapsulating member and a second encapsulating member.

In another such embodiment, the first encapsulating member includes a bore configured to receive one of the first and second spigot members therein. The first encapsulating member is attached to one of the second encapsulating member and the base chassis.

In another such embodiment, a bushing member interfaces between one of the first and second cavity of the pivot assembly and one of the first and second spigot members to facilitate assembly and rotation there between.

In another preferred embodiment, the bushing member includes an inner bore and an outer surface. One of the spigot members extends into the inner bore of the bushing member. The outer spigot member extending into the respective one of the first and second cavity.

In a preferred embodiment, the bushing member includes an inner bore and an outer surface. One of the spigot members includes an inner bore. The outer surface of the bushing member interfaces with the inner bore of the respective spigot member and interfaces with the respective one of the first and second cavity.

In one preferred embodiment, a biasing member is coupled to each of the knuckle assembly and the pivot assembly. As a result, the first housing element is biased relative to the second housing element in at least one of a closed orientation and a deployed orientation.

In yet another preferred embodiment, the biasing member comprises a cam hinge unit having an outer member and an inner member. The outer member is torsionally biased to the inner member. The outer member is fixed to one of the knuckle assembly and the pivot assembly. The inner member is fixed to the other of the knuckle assembly and the pivot assembly.

In one such embodiment, one of the spigot members includes a bore extending therein. The outer member of the cam hinge unit is coupled to the pivot assembly and the inner member is coupled to a bore extending in the respective spigot member.

In another preferred embodiment, one of the spigot members includes a bore extending therein. The outer member of the cam hinge unit is coupled to the bore extending in the respective spigot. The inner member is coupled to the pivot assembly.

In a preferred embodiment, the first housing element includes a microphone and the second housing element includes an earpiece speaker.

In another preferred embodiment, the second housing element includes a width, and the knuckle includes a width, the width of housing element is at least four times greater than the width of the knuckle.

In another aspect the disclosure is directed to a foldable electronic device comprising a first housing element, a second housing element, a knuckle assembly and a biasing member. The first housing element has a proximal end and a distal end. The second housing has a proximal end and a distal end. The proximal end includes a knuckle receiving slot. A pivot assembly extends about opposing sides of the receiving slot. The first housing element is pivotably coupled to the second housing element at the proximal end of each of the housing elements.

The knuckle assembly includes a base member, a knuckle and opposing spigot members. The base member is attached to the first housing element. The knuckle is positioned in the knuckle receiving slot of the second housing element. The knuckle extends outwardly from the base and includes opposing side surfaces. The opposing spigot members extend away from the opposing side surfaces of the knuckle and into the pivot assembly of the second housing element on opposing sides of the knuckle receiving slot. As a result, the first housing element pivots relative to the second housing element about an axis extending through the opposing spigot members.

In such an embodiment, the pivot assembly comprises a first cavity on a first side of the knuckle receiving slot, and a second cavity on the second side of the knuckle receiving slot. The first cavity is structurally configured to receive at least portion of the first spigot. The second cavity is structurally configured to receive at least a portion of the second spigot. Each spigot is rotatable within the respective cavity so as to rotate about the axis.

In a preferred embodiment, the first housing element comprises a base chassis and at least one encapsulating member. Each of the first and second cavities is formed through cooperation of the base chassis and the at least one encapsulating member.

In another preferred embodiment, the biasing member comprises a cam hinge unit having an outer member and an inner member. The outer member is torsionally biased to the inner member. The outer member is fixed to one of the knuckle assembly and the pivot assembly. The inner member is fixed to the other of the knuckle assembly and the pivot assembly.

BRIEF DESCRIPTION OF THE DRAWINGS

The disclosure will now be described with reference to the drawings wherein.

DETAILED DESCRIPTION OF THE DISCLOSURE

Figure 1:
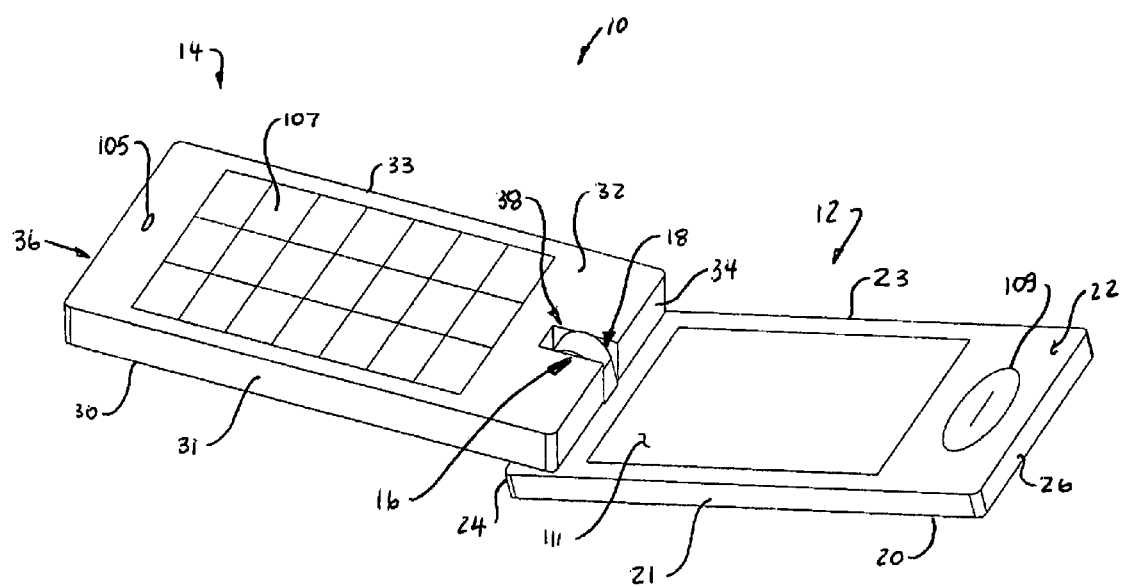
FIG. 1 of the drawings is a perspective view of an embodiment of the foldable electronic device of the present disclosure.

While this invention is susceptible of embodiment in many different forms, there is shown in the drawings and described herein in detail a specific embodiment with the understanding that the present disclosure is to be considered as an exemplification and is not intended to be limited to the embodiments illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, a foldable electronic device is shown generally at 10. The foldable electronic device may comprise a cellular telephone, although it is not limited to a cellular telephone. Indeed, other foldable electronic devices are likewise contemplated for use, such as a two-way radio, pager, smartphone, personal digital assistant, and the like.

In one embodiment, the foldable electronic device 10 comprises a first housing element 12, a second housing element 14 which is pivotably coupled through the use of a knuckle assembly 16 so as to pivot or flip between a collapsed orientation and a deployed orientation. In a cellular telephone embodiment, for example, the first housing element 12 includes an earpiece speaker 109 and a display screen 111.

The second housing element 14 includes, among other elements, a transceiver, a microphone 105 and a keypad 107. It will be understood that the first and second housing element embodiments are not to be deemed limiting and are deemed to be exemplary. For example, it will be understood that the components may be swapped between the first and second housing elements without departing from the scope of the invention.

In the embodiment described and shown in FIG. 1, first housing element 12 includes outer surface 20, inner surface 22, proximal end 24, distal end 26 and sides 21, 23. The various electronic components are housed within or on the surface of the first housing element. The first housing element may comprise a plastic or a metal construction and often includes a chassis that is surrounded by a plurality of panels.

The second housing element 14 includes outer surface 30, inner surface 32, proximal end 34, distal end 36 and sides 31, 33. Although not required, the first and second housing elements are sized so that they generally overlie each other with possible overhang of one housing element relative to the other housing element about one of the sides or the end. The second housing element, like the first comprises a base chassis with panels that form an enclosure and to which various electronic and structural components may be attached.

The proximal end 34 of the second housing element 14 includes a knuckle receiving slot 38 which is positioned between the sides 31, 33. The knuckle receiving slot, in the embodiment shown, is centrally positioned along the proximal end equidistantly between the respective sides 31, 33, although it may or may not be centrally positioned (i.e., offset). The knuckle receiving slot is typically substantially smaller than the width of the width of the second housing element. For example, the width of the second housing element at the proximal end may be four to ten times the width of the knuckle receiving slot. Of course, the slot is not limited to any particular width (i.e., widths of the slot which are greater or lesser than one fourth or one tenth the width of the second housing element are contemplated), however, it will be understood that with the present disclosure, structurally, the knuckle, and in turn the knuckle receiving slot, can be rather thin, while providing torsional stability to the device.

Figures 4, 5:
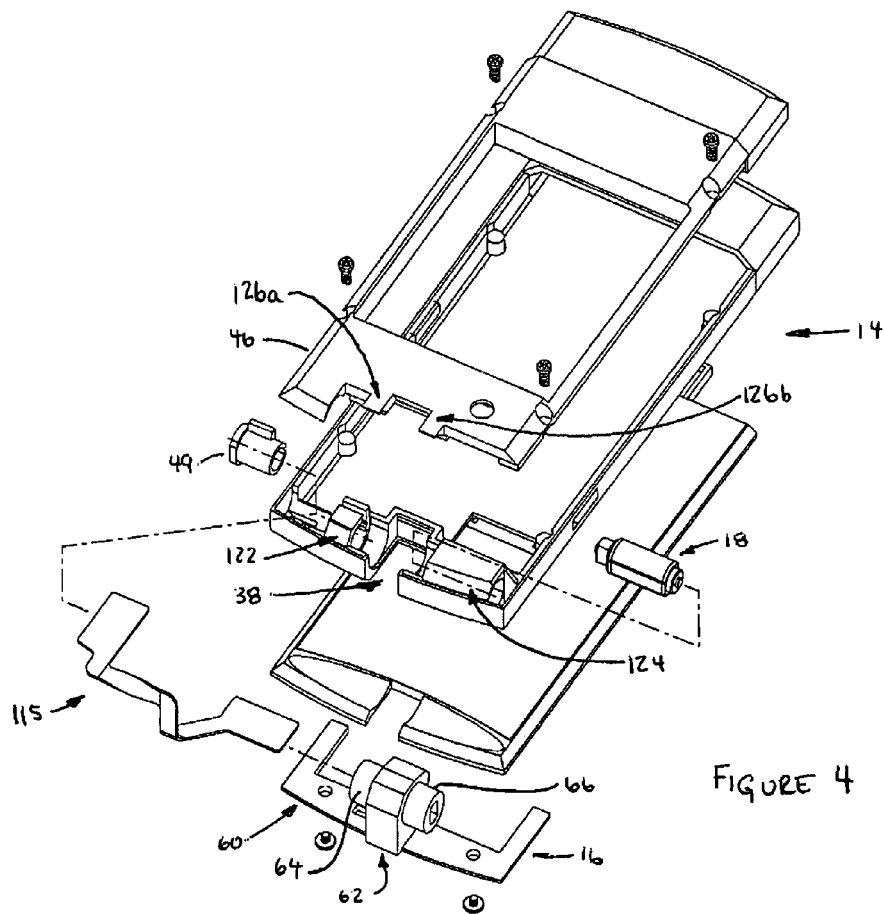
FIG. 4 of the drawings is an exploded perspective view of a portion of the first and second housing element of the present disclosure and the knuckle assembly of the present disclosure.
FIG. 5 of the drawings is a cross-sectional view of a portion of the foldable electronic device of the present disclosure shown in FIG. 4, showing, in particular, the mating of the pivot assembly with the knuckle assembly.

With reference to FIGS. 4 and 5, collectively, the second housing element 14 includes pivot assembly 39. The pivot assembly includes first cavity 40 and second cavity 42. The cavities are positioned on opposing sides of the knuckle receiving slot 38 at the proximal end. The first and second housing elements pivot about axis 100 (FIG. 5) which extends transversely through the first and second cavities and through the knuckle receiving slot 38. Each of the first and second cavities can include a number of different structures. As such, a number of differently configured cavities will be described (and shown in FIGS. 4 through 11) with the understanding that either the first or the second cavities can be configured as any one of the configurations. Generally, the first and second cavities include a largely cylindrical appearance, due to the cylindrical configuration of the spigots that will be rotating therein.

Sample structures will be described with the understanding that they can be swapped between first and second cavities and that they are exemplary in nature, and not to be deemed limiting configurations. The cavities are formed from base chassis 44 interfacing with an encapsulating member, such as first encapsulating member 46 or second encapsulating member 48 (FIGS. 8 through 11). Additionally, a bushing member 49 (FIG. 4) may be utilized to facilitate formation of the first and second cavities or to aid in the retention of the coupling assembly.

Figure 2A:
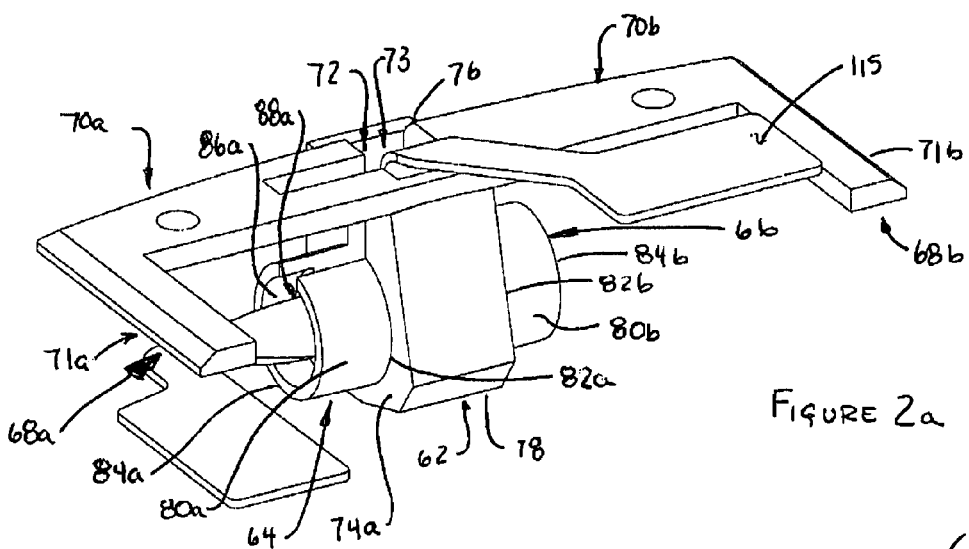
FIGS. 2a-2b of the drawings are opposing perspective views of an embodiment of a type of knuckle assembly of the present disclosure.
Figure 2B:
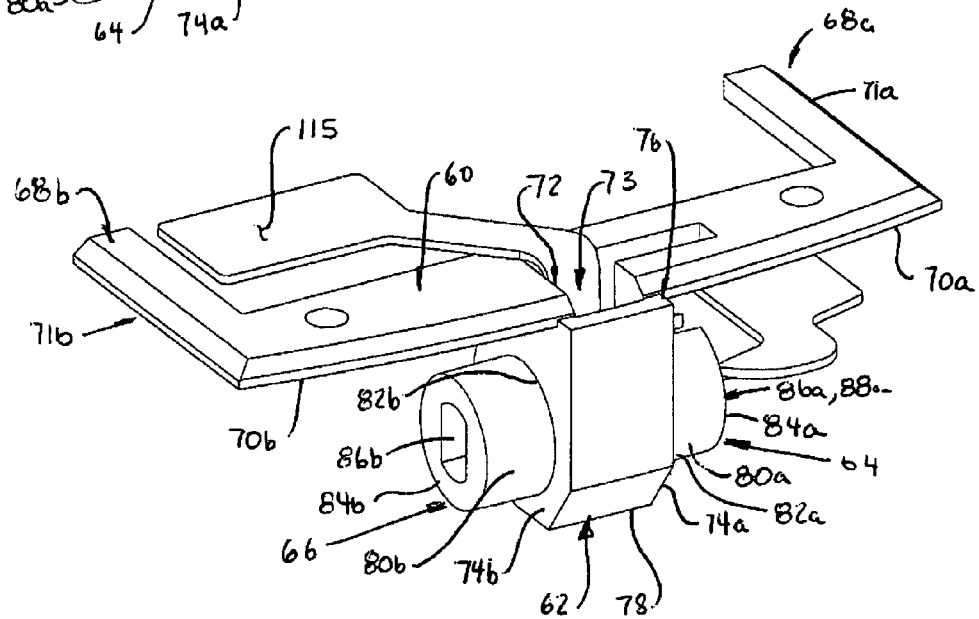

Knuckle assembly 16 is shown in greater detail in FIGS. 2a and 2b as comprising base member 60, knuckle 62, first spigot member 64 and second spigot member 66. The knuckle assembly is shown as comprising a single molded member, such as a molded stainless steel member. Of course, the knuckle assembly may be formed from different materials, such as other metals, or alloys thereof, as well as other natural or synthetic materials (i.e., polymers, etc.). It will be understood that the knuckle assembly can be formed from a plurality of different materials that are attached together with fasteners, adhesive or welding, for example.

The base member 60 is shown in FIGS. 2a and 2b as comprising opposing beams 68a, 68b. The opposing beams are substantially mirror images of each other and, as such, beam 68a will be described with the understanding that it is substantially a mirror image of beam 68b. Specifically, beam 68a includes first segment 70a and second segment 71a. The first segment extends from knuckle 62 and terminates at second segment 71a. The second segment 71a extends substantially perpendicularly to the first segment. In the embodiment shown, the first segment extends along the proximal end from the knuckle to the side of the second housing element. The second segment extends along the side of the second housing element a predetermined distance. As the first housing element is substantially rectangular, the first and second segments of opposing beam 68a comprises a substantially "L-shaped" configuration. Of course the first and second segments can be oblique to each other. Additionally a greater number or lesser number of beams and segments within beams may be provided.

The knuckle 62 comprises a body having opposed side surfaces 74a and 74b along with proximal end 76 and distal end 78. The proximal end 76 is associated with the base member 60 and the distal end extends away from the base member 60. The side surfaces 74a and 74b span between the proximal and distal ends, and in the embodiment shown, substantially perpendicular to each other defining a knuckle of substantially uniform width. The knuckle member may be provided with an internal passageway 72 with opening 73 at the proximal end 76. The knuckle fits within the knuckle receiving slot 38 (FIG. 1), and as such, is approximately one fourth of the width of the housing element, or less, such as one tenth of the housing element. While not limited thereto, it has been found with the construction of the knuckle assembly in the present disclosure, a substantially narrower knuckle can be utilized and deployed.

First spigot member 64 extends outwardly from opposing side surface 74a. The first spigot member 64 includes outer surface 80a (which is typically a cylindrical outer surface) extending from first end 82a to second end 84a. First end 82a is associated with opposing side surface 74a of the first spigot member 64. The spigot member further includes bore 86a and spigot passageway 88a. Spigot passageway 88a extends through the first spigot member and places the passageway 86a in fluid communication with the internal passageway 73. The spigot passageway 88a may terminate and be in fluid communication with bore 86a, where such a bore is present. In other embodiments, the spigot passageway 88a extends to the second end 84a of the first spigot member 64.

The second spigot member 66 is substantially similar to the first spigot member in configuration. In particular, second spigot member 66 is extends outwardly from opposing side surface 74b. The second spigot member 66 includes outer surface 80b (which is typically a cylindrical outer surface) extending from first end 82b to second end 84b. First end 82b is associated with opposing side surface 74b of the second spigot member 66. The spigot member further includes bore

86b. Additionally, the second spigot member may include a spigot passageway in addition to, or in place of spigot passageway 88a of the first spigot member.

It will be understood that the internal passageway of the knuckle and a spigot passageway 88a is in fluid communication with each other such that they collectively define a passageway or conduit between the first housing element and the second housing element. Thus communication cables or wires 115 (FIG. 2a) can be threaded through the passageways to link electronic components in each of the two housing elements together. In many embodiments, the electronic components can be linked with wire ribbons which include a plurality of wires.

Figure 3:
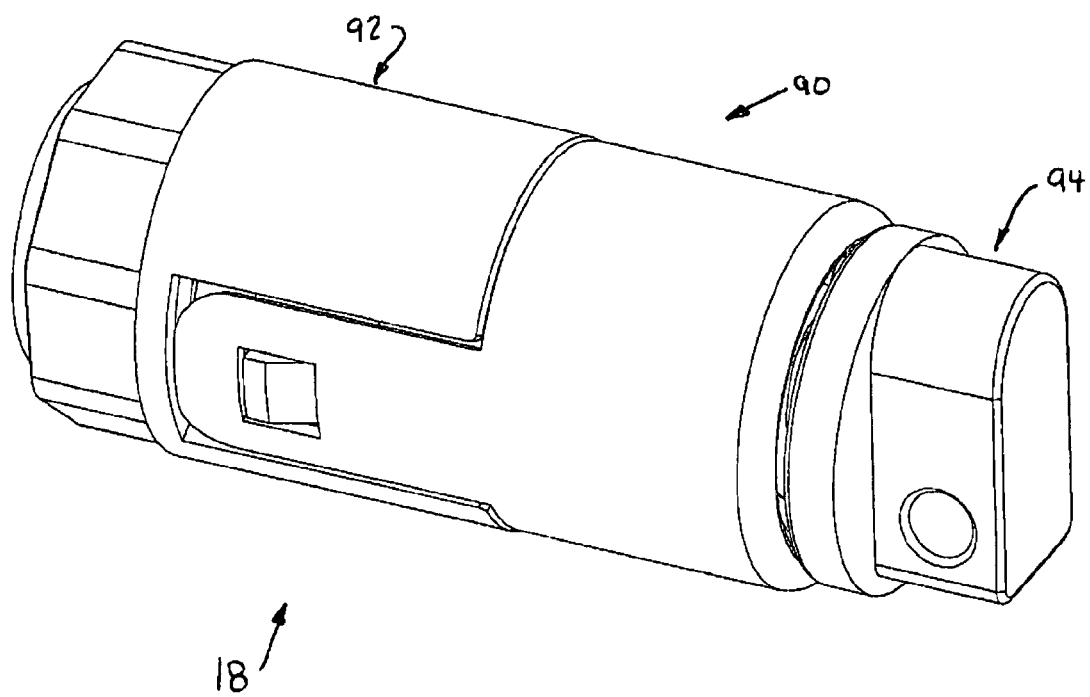
FIG. 3 of the drawings is a schematic perspective view of an embodiment of the biasing member, and in particular, a cam hinge, utilized in association with the pivotable coupling of the present disclosure.

Biasing member 18 is shown in FIG. 3 as comprising cam hinge member 90. The cam hinge member, in the embodiment shown, comprises a compact cylindrical element which includes outer member 92 and inner member 94, which are torsionally biased relative to each other. One of the inner member and the outer member comprises a cam and the other comprises a follower. The two members are biased against each other such that the follower is directed against the cam (which in turn, directs rotation of one member against the other member). One of the two members is fixedly coupled to the first housing element and the second is fixedly coupled to the second housing element such that rotation of the first housing element relative to the second housing element rotates the outer member relative to the inner member, and the cam against the follower. The cam is structured such that at an angle near the collapsed position, the cam directs the follower to maintain the closed orientation. The cam is also structured such that at an angle near the deployed orientation, the cam directs the follower to maintain the deployed orientation. In other embodiments, other biasing members are contemplated for use, including various torsional springs, extension springs or compression springs.

As set forth above, a number of spigot and pivot assembly combinations are contemplated for use. In particular, in one embodiment, shown in FIGS. 4 and 5, each of the spigot members includes an internal bore 86a, 86b. The base chassis 44 likewise includes opposing bores 122, 124. The bushing member 49 extends through one of the opposing bores 122 of the base chassis and into bore 86a of one of the opposing spigot members 64. The cam hinge member 90 is introduced into the opposing bore 124 of the base chassis 44, such that the outer member 92 is retained by the bore 124. The inner member 94 of the cam hinge member 90 extends into the bore 86b of the other spigot member 66 of the opposing spigot members. The encapsulating member 46 includes a plurality of prongs 126a, 126b each of which interface with opposing ones of the spigot members to, in turn, sandwich the spigot members between the encapsulating member 46 and the base chassis, while allowing rotation of the spigot members.

Figure 6:
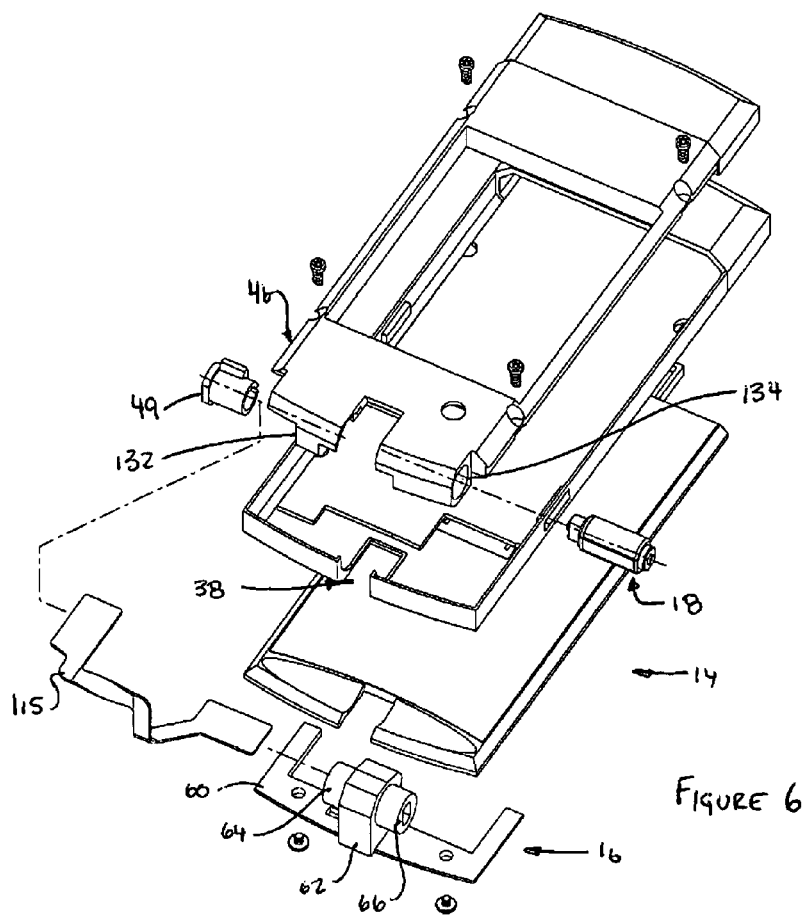
FIG. 6 of the drawings is an exploded perspective view of a portion of the first and second housing element of the present disclosure and the knuckle assembly of the present disclosure.
Figure 7:
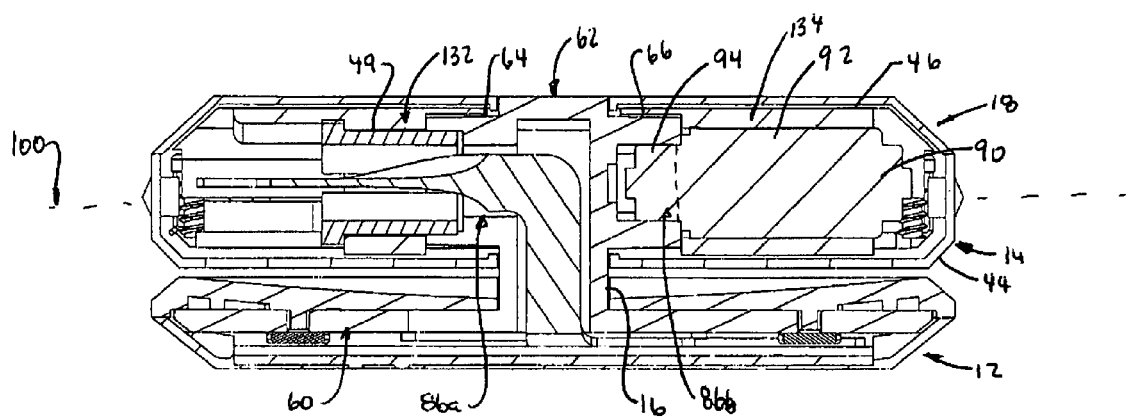
FIG. 7 of the drawings is a cross-sectional view of a portion of the foldable electronic device of the present disclosure shown in FIG. 6, showing, in particular, the mating of the pivot assembly with the knuckle assembly.

In another embodiment, shown in FIGS. 6 and 7, collectively, the encapsulating member 46 includes a plurality of bores 132, 134, instead of the base chassis. In particular, the bushing member 49 extends through bore 132 in the encapsulating member 46 and into bore 86a in the first spigot member 64. The cam hinge 90, and in particular, the outer member 92 thereof, extends within opposing bore 134 in encapsulating member 46. Inner member 94 of the cam hinge 90 extends into bore 86b of the second spigot member 66. Additionally, a portion of the encapsulating member extends over a portion of the first and second spigot members 64, 66 so as to sandwich the respective spigot between the base chassis and the encapsulating member.

Figure 8:
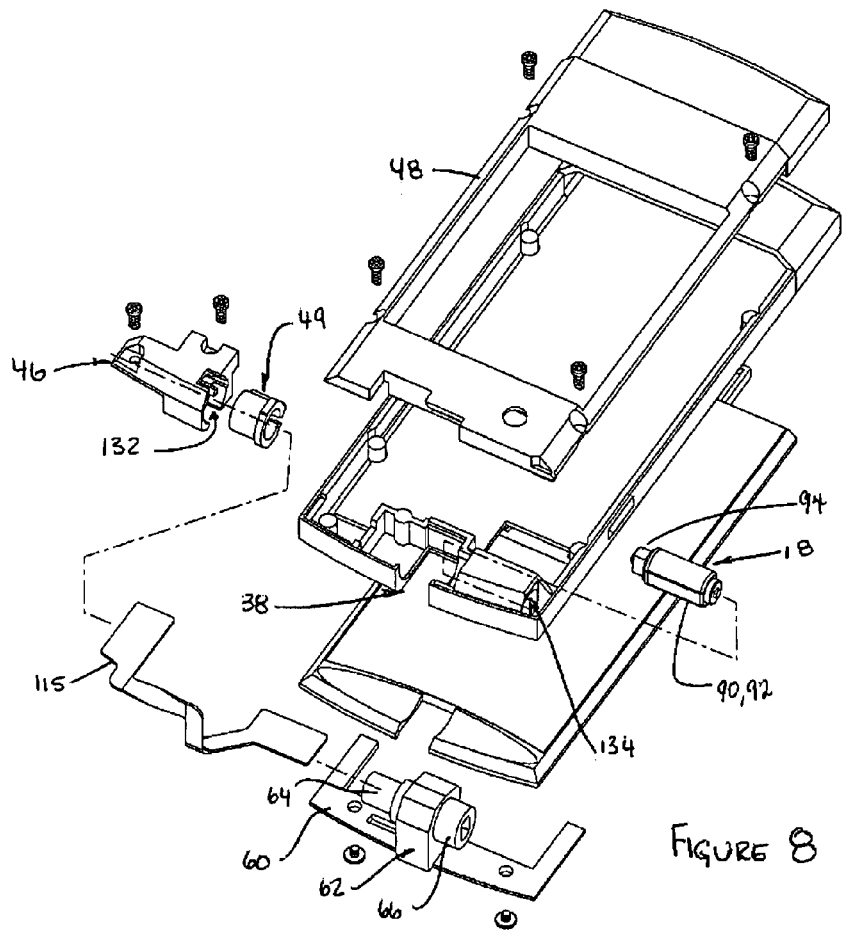
FIG. 8 of the drawings is an exploded perspective view of a portion of the first and second housing element of the present disclosure and the knuckle assembly of the present disclosure.
Figure 9:
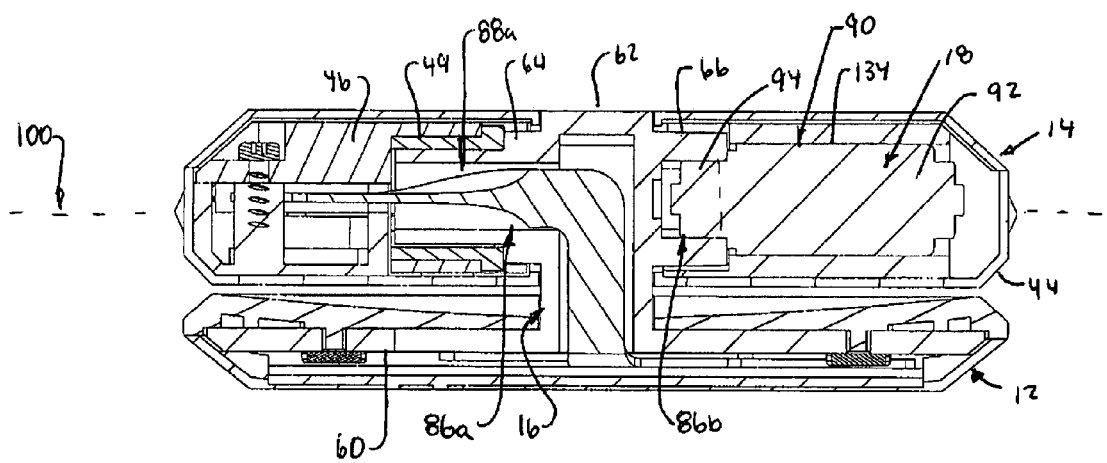
FIG. 9 of the drawings is a cross-sectional view of a portion of the foldable electronic device of the present disclosure shown in FIG. 8, showing, in particular, the mating of the pivot assembly with the knuckle assembly.

In a third embodiment, shown in FIGS. 8 and 9, collectively, a plurality of encapsulating members are contemplated. In such an embodiment, a first encapsulating member 46 includes a bore 132 within which bushing member 49 is positioned. First spigot member 64 extends into the inner bore of the bushing member 49. Outer member 92 of cam hinge 90 is positioned within bore 86b of the second spigot member 66. Inner member 94 of cam hinge 90 is captured between a portion of the second encapsulating member 48 and the base chassis 44. Additionally, the first spigot member 64 is captured between the base chassis 44 and the encapsulating member 46. The second spigot member 66 is captured between the base chassis 44 and the encapsulating member 48.

Figure 10:
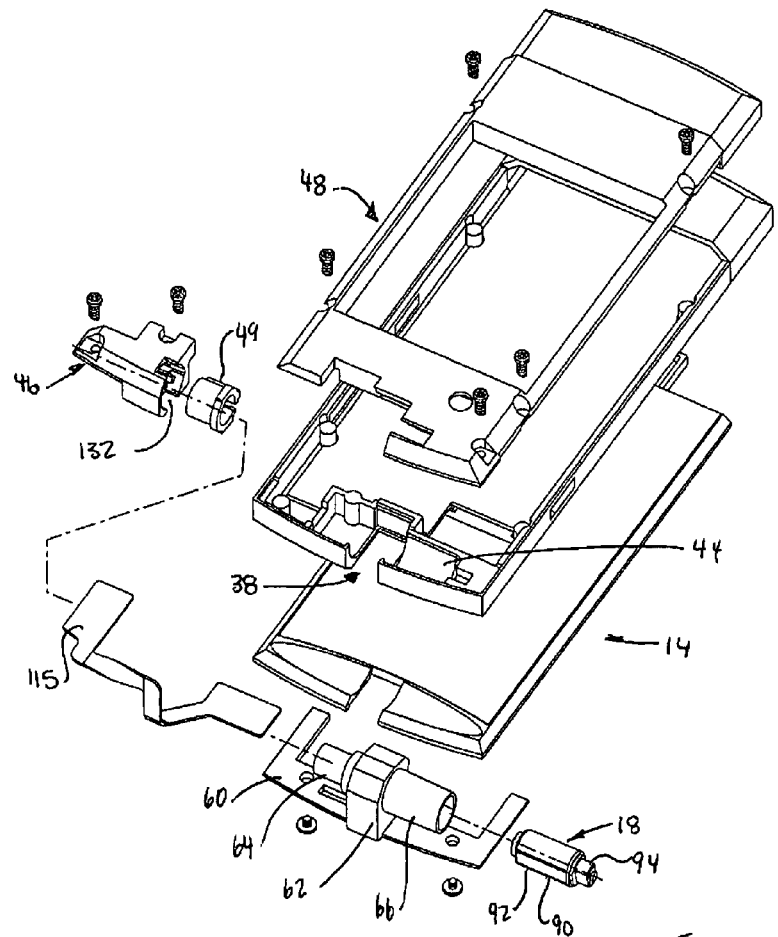
FIG. 10 of the drawings is an exploded perspective view of a portion of the first and second housing element of the present disclosure and the knuckle assembly of the present disclosure.
Figure 11:
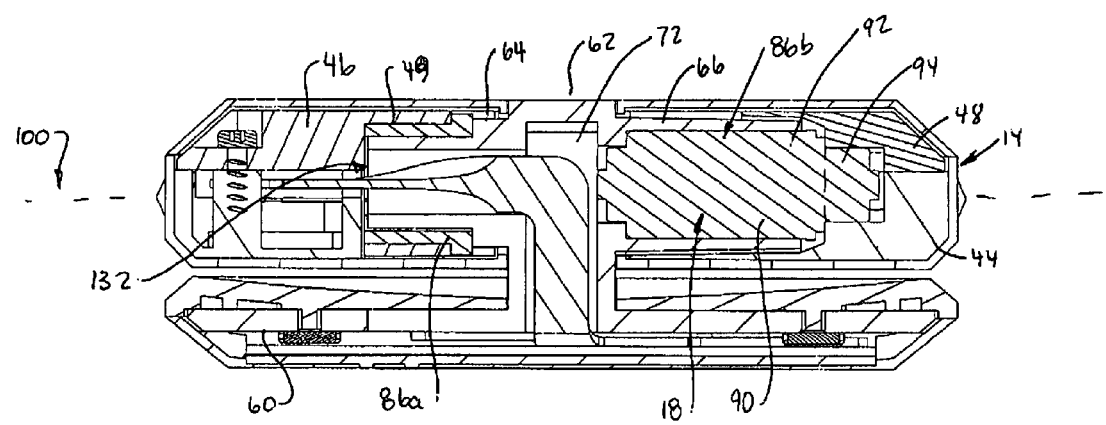
FIG. 11 of the drawings is a cross-sectional view of a portion of the foldable electronic device of the present disclosure shown in FIG. 10, showing, in particular, the mating of the pivot assembly with the knuckle assembly.

In yet another embodiment, shown in FIGS. 10 and 11, collectively a bore 132 is formed in the first encapsulating member 46. Bushing member 49 in directed into the bore of the first encapsulating member 46. First spigot member 46 is positioned within the inner bore of the bushing member 49. The outer member 92 of the cam hinge 90 is positioned within a bore 134 formed in the second encapsulating member 48. The inner member 94 extends into bore 86b of the second spigot member 66.

The foregoing embodiments are deemed to be exemplary and are not intended to limit the scope to the embodiments illustrated. In each of the foregoing embodiments, the yaw and wobble is controlled, while facilitating the use of a relatively narrow knuckle relative to the width of the overall foldable electronic device. Thus, the resulting hinge is relatively narrow and unobtrusive. It is envisioned that a number of alternative embodiments which may comprise various combinations of the above-described embodiments are likewise contemplated. For example, a plurality of bushing members may be utilized. Additionally, a plurality of encapsulating members, in excess of the two encapsulating members may be utilized. In addition, the foregoing embodiments may be modified to incorporate different biasing members, or to remove the biasing member altogether from the embodiment.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A foldable electronic device comprising:
    a first housing element having a proximal end and a distal end;
    a second housing element having a proximal end and a distal end, a knuckle receiving slot is defined at the proximal end and a pivot assembly extending about opposing sides of the receiving slot, the pivot assembly comprises a first cavity on a first side of the knuckle receiving slot, and a second cavity on the second side of the knuckle receiving slot; and
    the first housing element pivotably coupled to the second housing element at the proximal ends thereof by a knuckle assembly comprising:
        a base member attached to the first housing element;
        a knuckle positioned in the knuckle receiving slot of the second housing element, the knuckle formed with and extending outwardly from the base, the knuckle having opposing side surfaces; and
        opposing spigot members extending away from the opposing side surfaces of the knuckle and into the pivot assembly of the second housing element on opposing sides of the knuckle receiving slot, to, in turn, allow pivoting of the first housing element relative to the second housing element about an axis extending through the opposing spigot members;

wherein the first cavity structurally configured to receive at least a portion of the first spigot and the second cavity structurally configured to receive at least a portion of the second spigot, wherein each spigot is rotatable within the respective cavity so as to rotate about the axis, and wherein a bushing member interfacing between one of the first and second cavity of the pivot assembly and one of the first and second spigot members, the bushing member includes an inner bore and an outer surface, one of the spigot members extending into the inner bore of the busing member, and the outer surface extending into the respective one of the first and second cavity.

2. The foldable electronic device of claim 1 wherein the base includes opposing beams, each of the opposing beams including a first segment extending in a first direction from the knuckle and a second segment extending from the first segment in a second direction.

3. The foldable electronic device of claim 2 wherein the first segment and the second segment of each of the opposing beams comprise mirror images of each other about the knuckle and the first and second segments thereof are substantially perpendicular to each other, to in turn, define two L-shaped beams extending from the knuckle.

4. The foldable electronic device of claim 1 wherein the knuckle includes an internal knuckle passageway and at least one of the opposing spigots includes a spigot passageway in fluid communication with the internal knuckle passageway, at least one electrical cable extends from the first housing element to the second housing element through the internal knuckle passageway and the spigot passageway.

5. The foldable electronic device of claim 1 wherein the first housing element comprises a base chassis and at least one encapsulating member, each of the first and second cavities formed through cooperation of the base chassis and the at least one encapsulating member.

6. The foldable electronic device of claim 5 wherein the at least one encapsulating member comprises a first encapsulating member and a second encapsulating member.

7. The foldable electronic device of claim 6 wherein the first encapsulating member includes a bore configured to receive one of the first and second spigot members therein, the first encapsulating member is attached to one of the second encapsulating member and the base chassis.

8. The foldable electronic device of claim 1 further comprising a biasing member coupled to each of the knuckle assembly and the pivot assembly to, in turn, bias the first housing element relative to the second housing element in at least one of a closed orientation and a deployed orientation.

9. The foldable electronic device of claim 8 wherein the biasing member comprises a cam hinge unit having an outer member and an inner member, the outer member is torsionally biased to the inner member, the outer member is fixed to one of the knuckle assembly and the pivot assembly and the inner member is fixed to the other of the knuckle assembly and the pivot assembly.

10. The foldable electronic device of claim 9 wherein one of the spigot members includes a bore extending therein, the outer member of the cam hinge unit is coupled to the pivot assembly and the inner member is coupled to a bore extending in the respective spigot member.

11. The foldable electronic device of claim 9 wherein one of the spigot members includes a bore extending therein, the outer member of the cam hinge unit is coupled to the bore extending in the respective spigot and the inner member is coupled to the pivot assembly.

12. The foldable electronic device of claim 1 wherein the first housing element includes a microphone and the second housing element includes an earpiece speaker.

13. The foldable electronic device of claim 1 wherein the second housing element includes a width, and the knuckle includes a width, the width of the housing element is at least four times greater than the width of the knuckle.

14. A foldable electronic device comprising:
a first housing element having a proximal end and a distal end;
a second housing element having a proximal end and a distal end, a knuckle receiving slot is defined at the proximal end and a pivot assembly extending about opposing sides of the receiving slot, the pivot assembly comprises a first cavity on a first side of the knuckle receiving slot, and a second cavity on the second side of the knuckle receiving slot; and
the first housing element pivotably coupled to the second housing element at the proximal ends thereof by a knuckle assembly comprising:
a base member attached to the first housing element;
a knuckle positioned in the knuckle receiving slot of the second housing element, the knuckle formed with and extending outwardly from the base, the knuckle having opposing side surfaces; and
opposing spigot members extending away from the opposing side surfaces of the knuckle and into the pivot assembly of the second housing element on opposing sides of the knuckle receiving slot, to, in turn, allow pivoting of the first housing element relative to the second housing element about an axis extending through the opposing spigot members;
wherein the first cavity structurally configured to receive at least a portion of the first spigot and the second cavity structurally configured to receive at least a portion of the second spigot, wherein each spigot is rotatable within the respective cavity so as to rotate about the axis, and wherein a bushing member interfacing between one of the first and second cavity of the pivot assembly and one of the first and second spigot members, the bushing member includes an inner bore and an outer surface, one of the spigot members includes a spigot inner bore, the outer surface of the bushing member interfaces with the spigot inner bore of the respective spigot member and interfaces with the respective one of the first and second cavity.

15. The foldable electronic device of claim 14 wherein the base includes opposing beams, each of the opposing beams including a first segment extending in a first direction from the knuckle and a second segment extending from the first segment in a second direction.

16. The foldable electronic device of claim 15 wherein the first segment and the second segment of each of the opposing beams comprise mirror images of each other about the knuckle and the first and second segments thereof are substantially perpendicular to each other, to in turn, define two L-shaped beams extending from the knuckle.

17. The foldable electronic device of claim 14 wherein the knuckle includes an internal knuckle passageway and at least one of the opposing spigots includes a spigot passageway in fluid communication with the internal knuckle passageway, at least one electrical cable extends from the first housing element to the second housing element through the internal knuckle passageway and the spigot passageway.

18. The foldable electronic device of claim 14 wherein the first housing element comprises a base chassis and at least one encapsulating member, each of the first and second cavities formed through cooperation of the base chassis and the at least one encapsulating member.

19. The foldable electronic device of claim 18 wherein the at least one encapsulating member comprises a first encapsulating member and a second encapsulating member.

20. The foldable electronic device of claim 19 wherein the first encapsulating member includes a bore configured to receive one of the first and second spigot members therein, the first encapsulating member is attached to one of the second encapsulating member and the base chassis.

21. The foldable electronic device of claim 14 further comprising a biasing member coupled to each of the knuckle assembly and the pivot assembly to, in turn, bias the first housing element relative to the second housing element in at least one of a closed orientation and a deployed orientation.

22. The foldable electronic device of claim 15 wherein the biasing member comprises a cam hinge unit having an outer member and an inner member, the outer member is torsionally biased to the inner member, the outer member is fixed to one of the knuckle assembly and the pivot assembly and the inner member is fixed to the other of the knuckle assembly and the pivot assembly.

23. The foldable electronic device of claim 22 wherein one of the spigot members includes a bore extending therein, the outer member of the cam hinge unit is coupled to the pivot assembly and the inner member is coupled to a bore extending in the respective spigot member.

24. The foldable electronic device of claim 22 wherein one of the spigot members includes a bore extending therein, the outer member of the cam hinge unit is coupled to the bore extending in the respective spigot and the inner member is coupled to the pivot assembly.

25. The foldable electronic device of claim 14 wherein the first housing element includes a microphone and the second housing element includes an earpiece speaker.

26. The foldable electronic device of claim 14 wherein the second housing element includes a width, and the knuckle includes a width, the width of the housing element is at least four times greater than the width of the knuckle.

* * * * *